(12) United States Patent
Eber

(10) Patent No.: US 6,272,869 B1
(45) Date of Patent: Aug. 14, 2001

(54) MULTIPLE ORIFICE EXPANSION DEVICE

(75) Inventor: David H. Eber, La Crosse, WI (US)

(73) Assignee: American Standard International Inc., New York, NY (US)

( * ) Notice: Subject to any disclaimer, the term of this patent is extended or adjusted under 35 U.S.C. 154(b) by 0 days.

(21) Appl. No.: 09/607,630

(22) Filed: Jun. 30, 2000

(51) Int. Cl.$^7$ ............................................. F25B 41/00
(52) U.S. Cl. ............................ 62/197; 62/205; 62/511
(58) Field of Search ........................... 62/197, 205, 204, 62/210, 222, 511

(56) References Cited

U.S. PATENT DOCUMENTS

| | | | |
|---|---|---|---|
| 3,934,426 | * 1/1976 | Jespersen et al. | 62/205 |
| 4,263,787 | 4/1981 | Domingorena . | |
| 4,362,027 | * 12/1982 | Barbier | 62/197 |
| 4,394,816 | 7/1983 | Voorhis . | |
| 4,437,322 | 3/1984 | Ertinger . | |
| 4,606,198 | * 8/1986 | Latshaw et al. | 62/205 |
| 4,612,783 | 9/1986 | Mertz . | |
| 4,951,478 | 8/1990 | McDonald . | |
| 5,014,729 | 5/1991 | Sepso et al. . | |
| 5,031,416 | 7/1991 | Drucker et al. . | |
| 5,056,327 | * 10/1991 | Lammert | 62/205 |
| 5,081,847 | 1/1992 | Anderson, Jr. . | |
| 5,134,860 | * 8/1992 | Drucker | 62/511 |
| 5,170,638 | 12/1992 | Koenig et al. . | |
| 5,177,972 | * 1/1993 | Sillato et al. | 62/205 |
| 5,186,021 | 2/1993 | Keller . | |
| 5,214,939 | * 6/1993 | Drucker et al. | 62/511 |
| 5,341,656 | 8/1994 | Rust, Jr. et al. . | |
| 5,361,597 | * 11/1994 | Hazime et al. | 62/205 |
| 5,651,263 | * 7/1997 | Nonaka et al. | 62/205 |
| 5,660,050 | * 8/1997 | Wilson et al. | 62/205 |
| 5,706,670 | 1/1998 | Voorhis . | |
| 5,862,676 | * 1/1999 | Kim et al. | 62/197 |
| 6,053,000 | * 4/2000 | Levitin et al. | 62/205 |
| 6,233,956 | * 5/2001 | Katayama et al. | 62/197 |

* cited by examiner

Primary Examiner—Teresa Walberg
Assistant Examiner—Fadi H. Dahbour
(74) Attorney, Agent, or Firm—William J. Beres; William O'Driscoll

(57) ABSTRACT

An expansion device in a refrigeration chiller defines at least two fixed orifices and employs at least two positionable valve members in order to minimize the overall flow area through the expansion device under a first set of chiller operating conditions, to maximize the overall flow area through the expansion device under a second set of chiller operating conditions and to define a flow area intermediate said minimum and said maximum flow areas when a third set of chiller operating conditions exist.

20 Claims, 3 Drawing Sheets

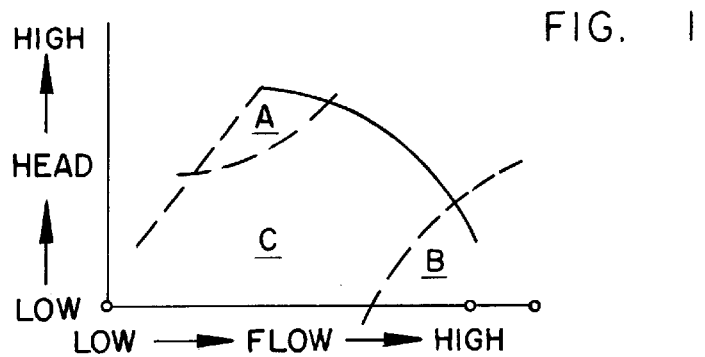
FIG. 1
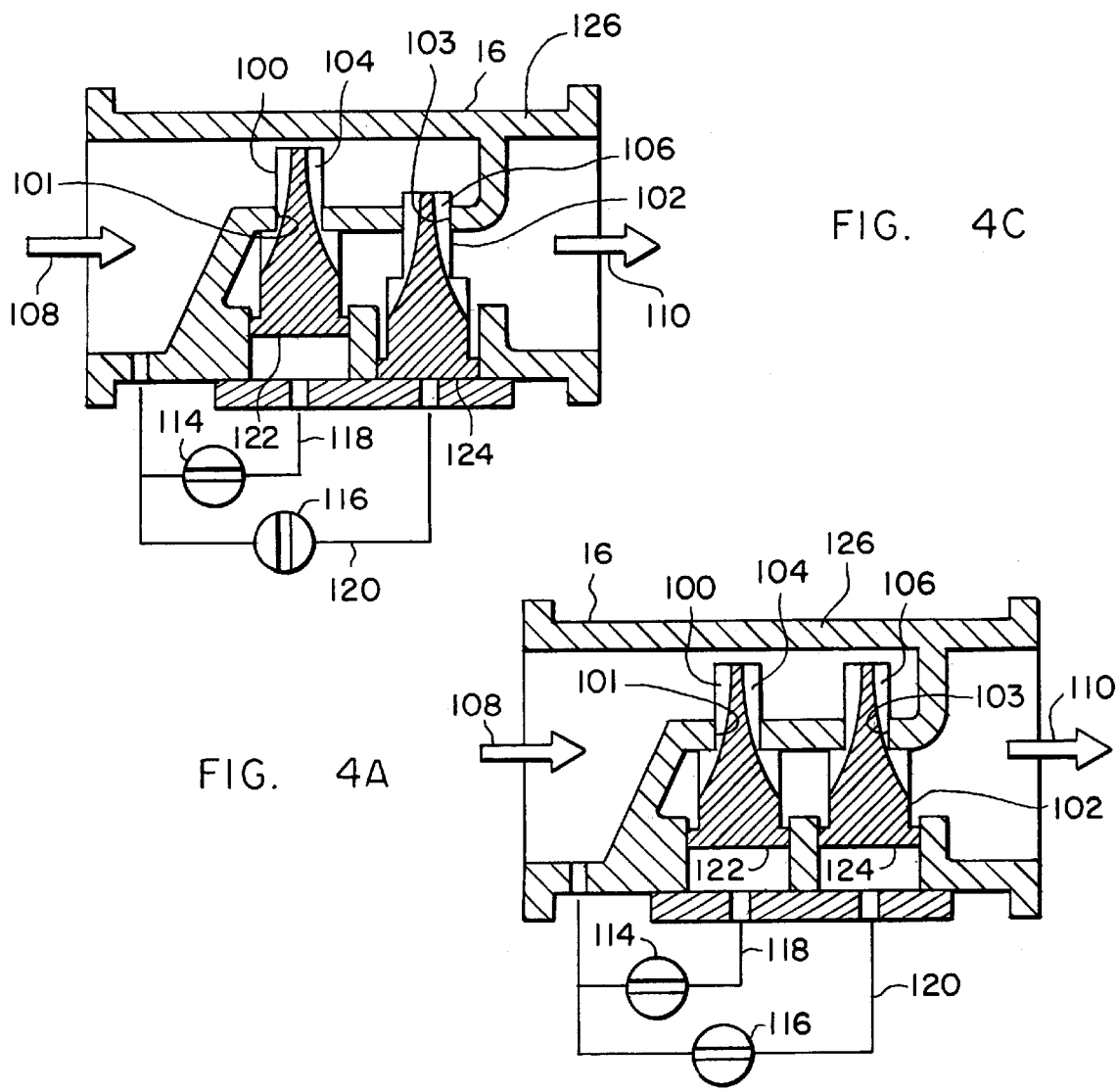
FIG. 4C
FIG. 4A

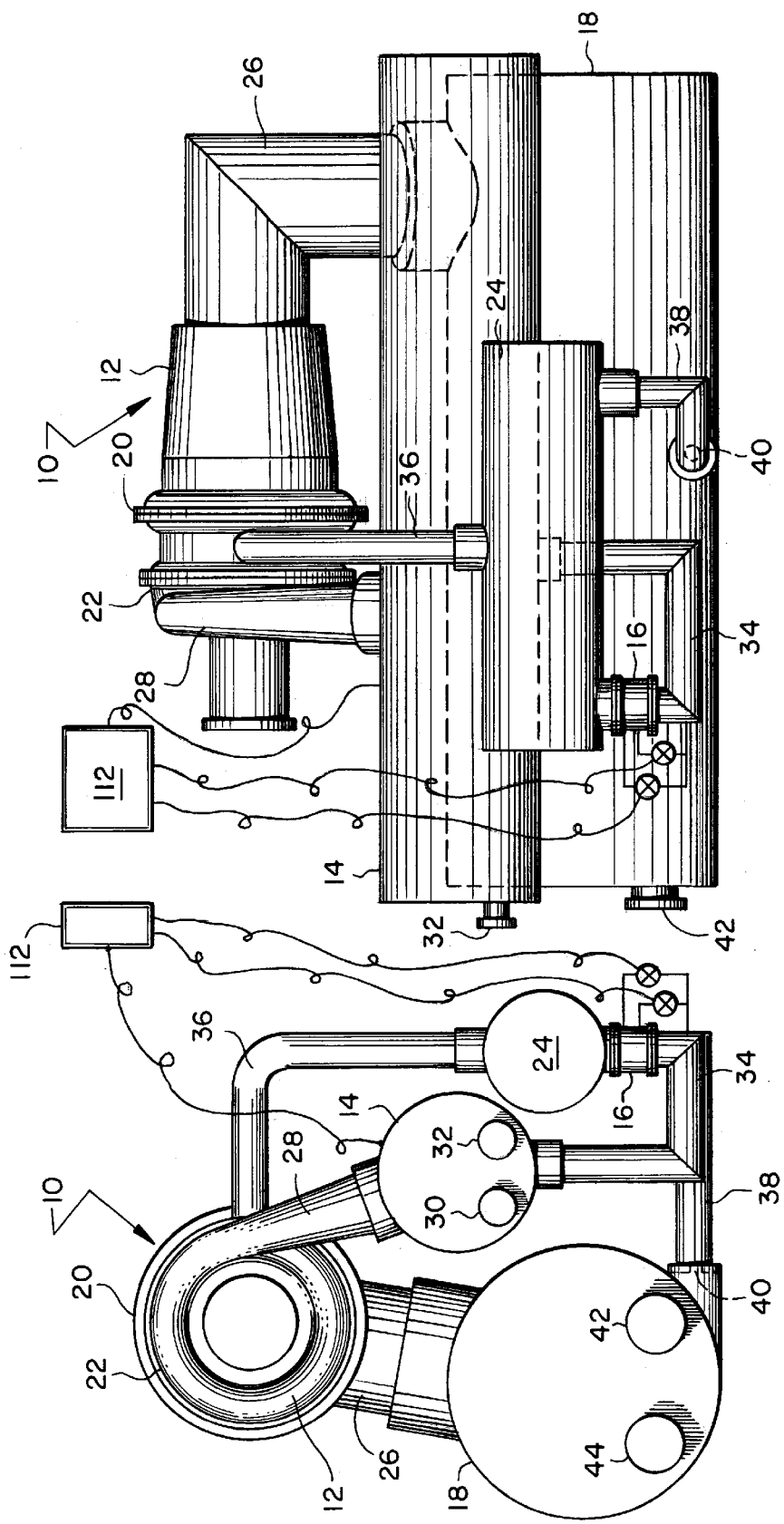

MULTIPLE ORIFICE EXPANSION DEVICE

BACKGROUND OF THE INVENTION

The present invention relates to expansion devices employed in refrigeration systems. More particularly, the present invention relates to a fixed orifice expansion device used in refrigeration chillers.

Refrigeration chillers are constituted of four basic components: a compressor, a condenser, an expansion device and an evaporator. These components are connected for flow to form a refrigeration circuit the most typical purpose of which is to chill a liquid such as water. The chilled liquid is most often used to comfort condition buildings or in industrial process applications.

In larger chillers employing multi-stage compressor, a so-called economizer component and a second expansion device is often employed for the purpose of enhancing overall chiller efficiency. A multi-stage compressor is one which compresses refrigerant gas more than once and in a stepwise fashion.

In that regard, in a chiller employing a compressor of the centrifugal type, one, two or more stages of compression may exist within the compressor. Compression is accomplished in each such stage by the high speed rotation of an impeller in a volute. Refrigerant gas is directed axially into the inlet portion of the impeller and is accelerated therethrough by the rotation of the impeller. By virtue of the acceleration and the decreasing volume through which the gas passes as it flows through the impeller, compression is achieved. Compressed gas exits the impeller, is collected in the volute and is then directed to the inlet of the impeller associated with the next stage of compression.

After the final stage of compression, relatively hot compressed refrigerant gas is discharged from the compressor into the chiller's condenser where it condenses as it undergoes heat exchange with a cooling fluid, most typically water sourced from a cooling tower, municipal water system or the like. The relatively warm and still relatively high pressure liquid refrigerant is directed out of the condenser, to and through an expansion device.

The simplest and most inexpensive form of expansion device used in refrigeration chillers is a fixed orifice which is sized in accordance with the particular application in which the chiller is employed. As a result of the pressure drop that occurs as the refrigerant flows through the expansion device, a portion of the liquid refrigerant flashes to gaseous form. As a result of that change of state, the refrigerant experiences a further cooling effect.

Because the portion of the refrigerant that flashes to gas in passing through the expansion device will still be at relatively high pressure, it can be collected in an economizer component and directed to a lower pressure, inter-stage location within the multi-stage compressor of a refrigeration chiller. The removal of this flash gas from the stream of refrigerant flowing to the evaporator increases the heat absorption capability of the refrigerant that makes its way into the evaporator and reduces the energy required to compress the gas that flows to the compressor from the evaporator. Chiller efficiency is enhanced thereby.

The portion of the refrigerant that remains in liquid form in the economizer flows from the economizer and to and through a second expansion device prior to entering the system evaporator. After entering the evaporator, the refrigerant undergoes heat exchange with and cools a liquid flowing therethrough. That liquid is ultimately used to cool the heat load it is the purpose of the chiller to cool. As a result of the heat exchange within the evaporator, the refrigerant vaporizes and is drawn, at relatively low pressure and temperature back to the first stage of the system compressor.

Heretofore, the use of a fixed orifice expansion devices to control refrigerant flow from the system condenser, while relatively simple and inexpensive, has generally resulted in less than optimal chiller performance under certain operating conditions that can exist at the edges of a chiller's operating envelope. In that regard, when so-called high head, low flow conditions exist with respect to the chiller's condenser, as in the region indicated in zone A in FIG. 1, there will typically be insufficient liquid refrigerant in the condenser to ensure that a continuous liquid seal exists at the location of the orifice located downstream of the condenser.

If a liquid seal is not maintained at the orifice location, hot refrigerant gas can flow directly out of the condenser and through the orifice without having undergone heat exchange with the cooling medium flowing through the condenser. The net effect of this circumstance, referred to as hot gas bypass, is to waste power for failure of the heat in the compressed refrigerant gas that is mechanically produced by the compressor to be rejected to the cooling medium flowing through the condenser.

On the other hand, under so-called high flow, low head conditions, as in the region indicated by zone B in FIG. 1, insufficient pressure will typically exist within the condenser to drive liquid refrigerant out of the condenser through the orifice in the quantity that is available and which the system is capable of using for cooling the downstream heat load. Under that circumstance, the chiller, in essence, uses more power to achieve less cooling which is, again, energy wasteful.

Overall, at high head, low flow conditions, the orifice downstream of the system condenser would advantageously be smaller, to ensure that hot gas bypass does not occur while at high flow, low head conditions, the orifice would advantageously be larger to ensure that the quantity of liquid refrigerant produced in the system condenser is capable of being delivered through the downstream expansion device to effect cooling. Under "normal" chiller operating conditions orifice size will be intermediate such small and large sizes so as to provide for refrigerant flow that is optimized for the particular chiller application and the "normal" conditions under which the chiller operates in the circumstances of its application.

While chillers can employ electronic expansion valves that vary orifice sizing to achieve such results, the use of such devices often cannot be justified due to the expense and system complication their use brings, in terms of additional sensors and controls associated with their use and the fact that high flow/low head and/or high head/low flow conditions may exist only rarely in the circumstances of the particular application in which a chiller is employed. The need therefore continues to exist for a fixed orifice expansion device for a refrigeration chiller that is relatively inexpensive, is simple to manufacture and control and is capable of appropriately governing refrigerant flow out of the system condenser even when the chiller is operating under conditions at the edges of its operating envelope.

SUMMARY OF THE INVENTION

It is an object of the present invention to provide a fixed orifice expansion device for a refrigeration chiller that is capable of metering refrigerant flow in proper quantities under essentially all chiller operating conditions, including at least two such conditions that fall outside of what are considered to be "normal" chiller operating conditions.

It is another object of the present invention to provide a fixed orifice expansion device for a centrifugal chiller which, by the use of multiple fixed orifices, controls refrigerant flow therethrough in a manner which optimizes chiller performance across the chiller's operating envelope, including under high head/low flow and high flow/low head conditions.

It is another object of the present invention to provide a multiple orifice expansion device in which the control of refrigerant flow through the device's multiple fixed orifices does not require the use of a liquid level sensor.

It is a further object of the present invention to provide an expansion device which employs positionable orifices having relatively broad flow ranges that permit the transition in the refrigerant flow area cooperatively defined thereby, as chiller operating conditions change, in a manner which does not disrupt chiller operation, is easily controlled and does not rely on liquid level sensors to control orifice position.

It is a still further object of the present invention to provide an easily manufactured, relatively inexpensive fixed orifice expansion device for the control of refrigerant flow which, by the use of multiple fixed orifices of different shape and flow area, is capable of use over a broad range of chiller sizes.

These and other objects of the present invention, which will better be understood by reference to the following Description of the Preferred Embodiment and attached Drawing Figures, are accomplished in an expansion device which employs multiple, positionable fixed orifices to ensure that the flow of liquid refrigerant from the system condenser is appropriate to the operating condition that exists at a particular time. Each orifice in the device is positionable between a first and a second position. In combination, the orifices offer a reduced flow area to refrigerant flowing out of the system condenser when high head, low flow conditions exist, a relatively large flow area when high flow, low head conditions exist and an optimized flow area for refrigerant when "normal" chiller operating conditions exist.

DESCRIPTION OF THE DRAWING FIGURES

FIG. 1 is a graph which generally illustrates the operating envelope of a refrigeration chiller in the context of condenser head pressure versus refrigerant flow.

FIGS. 2 and 3 illustrate a multi-stage refrigeration chiller of the type capable of employing the expansion device of the present invention.

Figure 4B:
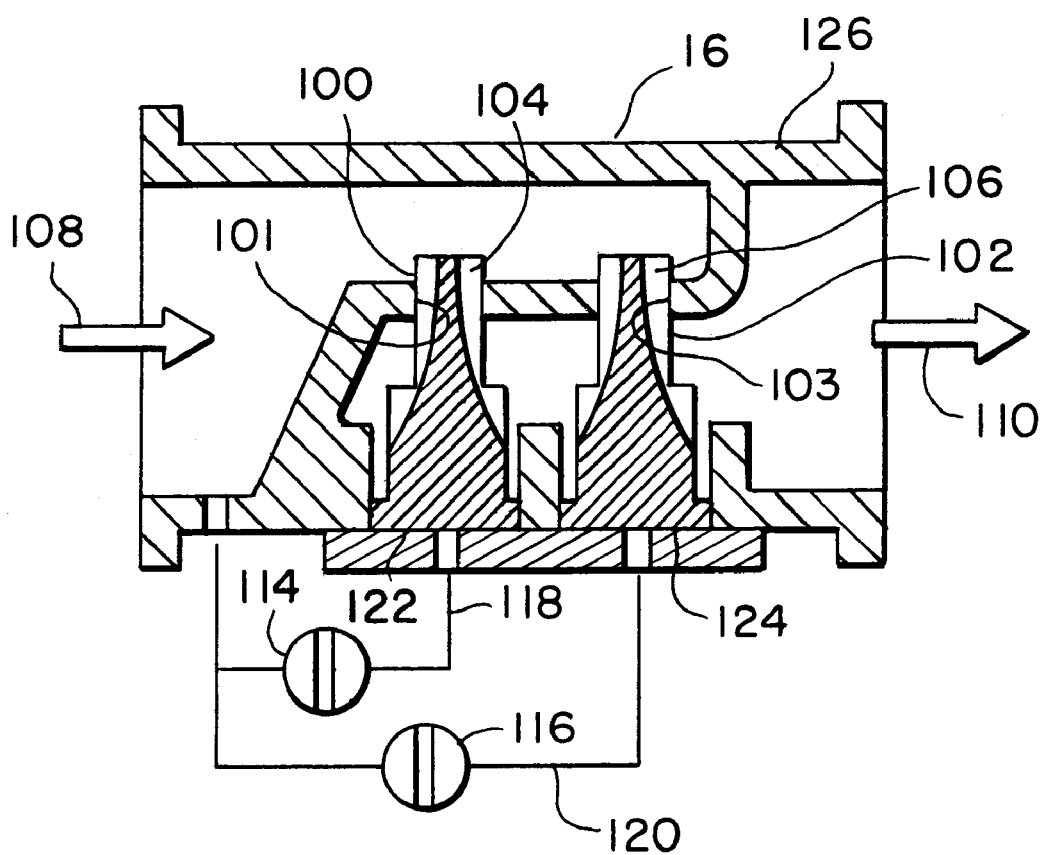

FIGS. 4A, 4B and 4C schematically illustrate the multiple orifice expansion device of the present invention and the positioning of the orifices therein under different chiller operating conditions.

DESCRIPTION OF THE PREFERRED EMBODIMENT

Referring now to FIGS. 2 and 3, in addition to FIG. 1, the primary components of refrigeration chiller 10 are a compressor 12, a condenser 14, an expansion device 16 and evaporator 18. In the most basic sense of chiller operation, compressor 12 receives relatively cool, low pressure refrigerant gas from evaporator 18, compresses it and discharges it, at a higher pressure and temperature, to condenser 14. The high pressure, high temperature refrigerant gas delivered to condenser 14 is cooled therein and condenses to the liquid state. Condensed refrigerant flows out of the condenser to and through expansion device 16.

A portion of the liquid refrigerant that flows through expansion device 16 vaporizes as a result of its flow therethrough which reduces both the temperature and pressure of the refrigerant. Ignoring, for the moment, the economizer and second expansion device of chiller 10, which may or may not be employed as the case may be, relatively cool, low pressure liquid refrigerant is directed from expansion device 16 into evaporator 18 where it cools the medium which is ultimately used to cool the heat load it is the purpose of the chiller to cool. As a result of such heat exchange within the evaporator, the refrigerant vaporizes and is then drawn thereoutof by compressor 12 to start the process anew.

In the chiller of the preferred embodiment, compressor 12 is of the centrifugal type. Liquid chillers may employ compressors of other types, including those of the screw, reciprocating and scroll type. Further, compressor 12 is a multi-stage compressor and compresses refrigerant gas, in the FIGS. 1 and 2 embodiment, in a two-step process. That is, refrigerant gas entering compressor 12 from evaporator 18 is compressed in first stage 20 of compressor 12 and is then directed into second stage 22 of the compressor where further compression occurs. Chillers employing compressors of any of the types noted above fall within the scope of the present invention scope as do chillers which employ single, two-stage and more than two stages of compression.

Because compressor 12 of chiller 10 of the preferred embodiment employs a two-stage compressor, it is one, as will subsequently be described, which advantageously makes use of an economizer 24 for purposes of increasing chiller efficiency. As has been noted, refrigerant gas is drawn out of evaporator 18 through piping 26 and is compressed to a first pressure in first stage 20 of compressor 12. Gas at that first pressure is then delivered to second stage 22 of compressor 12 where it is further compressed to an elevated second pressure.

The hot, compressed refrigerant gas is discharged from compressor 12 through volute 28 into condenser 14 where it undergoes heat exchange with a relatively cool medium that enters the condenser through inlet 30 and exits the condenser through outlet 32. Refrigerant gas condenses to liquid form as a result of that heat exchange process that occurs in the condenser and the now condensed refrigerant flows out of condenser 14 through piping 34 to expansion device 16.

As a result of the passage of the liquid refrigerant through expansion device 16, which, in the preferred embodiment, is positioned upstream of or at the inlet of economizer 24, a portion of the refrigerant flashes to gas. That gas is collected in the upper portion of the economizer and is at a pressure that is higher than the pressure to which refrigerant gas is compressed in the first stage 20 of compressor 12. The relatively high pressure gas collected in economizer 24 flows, as a result of differential pressure, through piping 36 into the stream of gas flowing from first stage 20 to second stage 22 of the compressor. The removal of this flash gas from the stream of refrigerant flowing to evaporator 18 increases the heat absorption capability of the refrigerant that makes its way into the evaporator and reduces the energy required to compressor the gas that flows out of the evaporator into first stage 20 of compressor 12. The energy efficiency of the chiller is enhanced thereby.

The majority of the refrigerant delivered into economizer 24 will remain in liquid form and will flow out of the economizer through piping 38 to a second expansion device 40 which is upstream of or at the inlet to evaporator 16. As it passes through expansion device 40, the refrigerant is further cooled and proceeds to absorb heat from the medium that enters evaporator 18 through inlet 42 and exits therefrom through outlet 44. As a result of the heat exchange within the evaporator, the medium is chilled prior to its delivery from the evaporator to a location, most typically in a building or industrial process, which requires cooling.

In prior chiller systems, a single fixed orifice expansion device has often been employed to control refrigerant flow from the system condenser. However, high head, low flow operating conditions as well as high flow, low head operating conditions can exist at certain times and can significantly degrade the operation of the chiller from an efficiency standpoint. The efficiency degradation results from the limits imposed by the use of a single fixed orifice expansion device to control refrigerant flow from the condenser and the inability of such a device to modify the flow area it defines in the face of such system operating conditions.

Under high head, low flow conditions, as described above, liquid refrigerant may be produced in insufficient quantity within the system condenser to ensure that a liquid seal is maintained at the orifice of the expansion device downstream of the condenser. When such conditions exist, chiller efficiency would be enhanced if the flow area through the expansion device were reduced.

Under high flow, low head conditions, on the other hand and as likewise described above, significant amounts of liquid refrigerant are produced in the condenser but the pressure therein may be insufficient to cause the flow of liquid refrigerant out of the condenser, against the size of the flow area defined by the downstream expansion device, in the quantity which is available for use in cooling the heat load on the chiller. When that condition exists, a larger flow area would preferably be offered by the expansion device to accommodate increased liquid flow and thereby enhance chiller efficiency.

It is to be understood that the conditions that constitute high head, low flow conditions and high flow, low head conditions, as well as "normal" operating conditions, will vary from chiller to chiller and from one chiller application to the next. As such, for purposes of this invention, "normal" chiller operating conditions are defined by the chiller manufacturer and/or owner in accordance with a particular chiller and its application. High head, low flow as well as high flow, low head and any other operating condition that falls outside of the defined "normal" operating conditions and which can be addressed by use of the expansion device of the present invention will likewise be defined.

Referring additionally now to FIGS. 4A, 4B and 4C, the multiple orifice expansion device of the present invention is illustrated. Expansion device 16 includes a first orifice valve 100 associated with orifice 101 and a second orifice valve 102 associated with orifice 103. As will be appreciated, flow through orifices 101 and 103 is in parallel. Valves 100 and 102 are, in the preferred embodiment, fluted and define multiple slots, 104 and 106 respectively, which cooperate to offer a decreasing flow area in a downstream refrigerant flow direction, indicated by arrows 108 and 110.

When both valves 100 and 102 are in the up position, as is illustrated in FIG. 4A, the flow area through which refrigerant can flow through orifices 101 and 103 is at its most restricted. Under that circumstance, high head, low flow conditions, indicated by zone A of FIG. 1, are accommodated by the reduced area through which liquid refrigerant can flow. The reduced flow area better assures that a liquid seal is maintained at the orifice location and reduces the likelihood that energy-wasteful hot gas bypass will occur.

When both valves 100 and 102 are in the down position, as is illustrated in FIG. 4B, the flow area through expansion device 16 is at its maximum. The valves are positioned in this manner when high flow, low head conditions exist, as indicated by zone B in FIG. 1. In this position, a relatively large amount of liquid refrigerant flow through the expansion device is facilitated which, once again, prevents the energy wastage that would otherwise occur if the larger flow area were unavailable to accommodate liquid refrigerant flow in the quantity available in the condenser.

When only one of valves 100 and 102 are in the up position, the flow area through expansion device 16 is intermediate the flow areas that are defined when both valves are up or down. This will be the most typical position of the valves since they are positioned as such under normal chiller operating conditions, as indicated by zone C of FIG. 1.

The position of valves 100 and 102, in the preferred embodiment, is a function of chiller operating parameters that are already sensed by the chiller's controller 112 for reasons not associated with expansion valve control and does not require the use of or input from a liquid level sensor. That is, parameters already sensed by controller 112 can be used to sense changes in overall chiller operating conditions including entry into zones A and B of FIG. 1. Such already sensed parameters are used, in the present invention, to determine what the relative positions of valves 100 and 102 should be at a particular time. Condenser pressure, which is available in the immediate location of device 16, is advantageously used in the preferred embodiment to position the orifice valves.

In that regard, when chiller operating conditions are such that one or both of the valves are required to be in the up position, simple solenoid valves, associated one each with valves 100 and 102, are activated by controller 112 to open a flow path for gas at condenser pressure from upstream of the expansion device to the bottom of the respective orifice valve with which the solenoid is associated. As is indicated in FIGS. 4A, 4B and 4C, solenoid 114 is associated with valve 100 while solenoid 116 is associated with valve 102.

The opening of solenoids 114 and 116 permits gas at condenser pressure to flow through lines 118 and 120 that communicate between a condenser pressure location upstream of expansion device 16 and the actuating surfaces 122 and 124 on the underside of valves 100 and 102 respectively. When solenoids 114 and 116 are closed, the actuating surfaces of valves 100 and 102 become isolated from the source of condenser pressure that otherwise maintains them in the up position. Gravity and/or a spring (not shown) can be employed to return valves 100 and 102 to the down position when solenoids 114 and 116 close.

It is to be noted that expansion device 16 is capable of being employed over a broad range of chiller sizes with relatively little modification or expense. In that regard, by varying the shape of slots 104 and 106 of valves 100 and 102 and the flow areas they cooperatively define in the up and down positions, expansion device 16 can be made use of in chillers of different sizes and in different chiller applications simply by incorporating appropriately sized orifice valves therein. The remainder of expansion device 16, including its body, needs no alteration to cover an entire chiller product range. Further, the valve members themselves can and preferably will be identical in all applications, other than with respect to the flow area they define. Still further, depending upon the particular application, one of valves 100 and/or 102 could be configured to completely cut off flow through the orifice with which it is associated to minimize the flow area through the expansion device when in the "up" position or to be completely withdrawn from the orifice with which it is associated to maximize the flow area through the expansion device when in the down position.

It is also to be noted that because individual orifice valves 100 and 102 each cover a relatively broad range of flow, the transition in the size of the refrigerant flow area through expansion device 16 as chiller operating conditions change can be accomplished smoothly and without interruption of chiller operation. This is for the reason that a relatively large deadband can be designed to exist which accommodates the movement of the individual orifice valves from one position to the other, as system operating conditions change, without the disruption of chiller operation. Overall, control of expansion device 16 and the individual orifice valves therein is a relatively uncomplicated task and the transition in the position of the individual orifice valves does not adversely affect ongoing chiller operation to any significant degree.

It is still further to be noted when chiller 10 first starts up, individual orifice valves 100 and 102 will be controlled by controller 112 to be in the down position for some period of time to ensure the availability of a maximum flow area for refrigerant out of the system condenser. This is because when the chiller initially starts up, pressures within the system will typically have equalized and it will take some period of time for condenser pressure to build. Therefore, both valves 100 and 102 will be maintained in the down position at chiller start-up, even though "normal" chiller operating conditions may exist, until such time as condenser pressure rises to a predetermined level. Such positioning, like the positioning of the orifice valves during system operation, is by the use of information already available within the chiller's controller and is an uncomplicated task.

Finally, it is to be noted that while expansion device 16 of the present invention in its preferred embodiment employs multiple positionable orifice valves disposed in a unitary housing 126, the use of a separate housing for each valve member and the use of more than two orifice valves in a single or multiple housings is contemplated hereby.

While the present invention has been described in terms of a preferred embodiment, it will be appreciated that modifications thereto by those skilled in the art will fall within its scope.

What is claimed is:

1. A refrigeration chiller comprising:
   an evaporator;
   a compressor, said compressor drawing refrigerant gas from said evaporator;
   a condenser, said condenser receiving compressed refrigerant gas from said compressor; and
   an expansion device, said expansion device receiving liquid refrigerant from said condenser, defining a first and a second orifice and having a first and a second valve member, each of said first and said second orifices being of a predetermined, fixed size, flow through said first and said second orifices being in parallel, said first valve member being positionable in a first and a second position with respect to said first orifice and said second valve member being positionable in a first position and a second position with respect to said second orifice, the positioning of said valve members with respect to the orifice with which they are associated cooperatively determining the total flow area through said expansion device.

2. The chiller according to claim 1 wherein when a first set of chiller operating conditions exist said first and said second valve members are positioned to minimize the total flow area through said expansion device, when a second set of chiller operating conditions exist said valve members are positioned to maximize the total flow area through said expansion device and when a third set of chiller operating conditions exist, said valve members are positioned to cooperatively define a flow area through said expansion device which is intermediate the minimum and said maximum flow areas.

3. The chiller according to claim 2 further comprising a controller, said controller controlling the operation of said chiller and being capable of identifying the existence of said first, said second and said third set of chiller operating conditions, said controller controlling the position of said first and said second valve members in accordance with which of said first, second and third set of operating conditions exist in said chiller.

4. The chiller according to claim 3 wherein power consumption by said chiller is minimized by positioning said valve members in accordance with the one of said first, second and third set of chiller operating conditions which is sensed to exist.

5. The chiller according to claim 4 wherein said first set of chiller operating conditions are conditions under which, absent the positioning of said first and said second valve members to minimize the flow area through said expansion device, insufficient liquid refrigerant can be expected to be produced in said condenser to ensure the continuous maintenance of a liquid seal at the location of said first and said second orifices and wherein said second set of chiller operating conditions are conditions under which the pressure in said condenser is sufficiently low and the quantity of liquid refrigerant available in said condenser is sufficiently high to warrant positioning said first and said second valve members to maximize the flow area through said expansion device.

6. The chiller according to claim 3 wherein the identification of said first, said second and said third operating conditions by said controller is without input to said controller from a liquid level sensor in said condenser.

7. The chiller according to claim 3 wherein said first and said second valve members are positioned by the use of condenser pressure.

8. The chiller according to claim 3 wherein said at least two valve members are positioned to define said maximum flow area for a predetermined period of time subsequent to the start-up of said chiller, the positions of said valve members thereafter being determined in accordance with the one of said first, second and third set of chiller operating conditions under which said chiller is then operating.

9. The chiller according to claim 3 wherein said compressor compresses refrigerant gas in at least two stages and wherein said chiller further comprises an economizer, said expansion device being disposed upstream of said economizer.

10. The chiller according to claim 3 wherein each of said two valve members has an actuating surface and further comprising conduit communicating between a location in said chiller which is at condenser pressure and the actuating surfaces of said first and said second valve members, a solenoid valve being interposed in said conduit between said location and the actuating surfaces of each of said valve members, said controller controlling the position of said solenoid valves.

11. A method for controlling refrigerant flow from the condenser to a evaporator of a refrigeration chiller comprising the steps of:

defining a plurality of fixed orifices in the refrigerant flow path by which said condenser and said evaporator are connected, the flow path through said orifices being in parallel;

disposing a plurality of valves that are each positionable in first and second positions with respect to one of said plurality of orifices, the flow area through which refrigerant is permitted to flow through an individual orifice being determined by the position of the one of said plurality of valves associated with it and the totality of the flow area through said plurality of orifices being a function of the positions of said plurality of valves;

positioning said plurality of valves to cooperatively minimize the flow area through said plurality of orifices when a first set of chiller operating conditions exists;

positioning said plurality of valves to cooperatively maximize the flow area through said plurality of orifices when a second set of chiller operating conditions exists; and positioning said plurality of valves to cooperatively define a flow area intermediate said minimum and said maximum flow areas when a third set of chiller operating conditions exists.

12. The method for controlling refrigerant flow according to claim 11 comprising the further steps of sensing which of said first, said second and said third set of chiller operating conditions exist and controlling the positioning of said plurality of valves in accordance with the operating condition sensed in said sensing step.

13. The method for controlling refrigerant flow according to claim 12 wherein said sensing step includes the steps of sensing conditions under which the quantity of liquid refrigerant available in said condenser is likely to be insufficient to ensure the continuous existence of a liquid seal at the location of said plurality of orifices and then proceeding to said step of positioning said plurality of valves to minimize the flow area through said plurality of orifices; sensing conditions under which the pressure in said condenser is likely to be insufficient to drive liquid refrigerant out of said condenser in the quantity that is available in said condenser and then proceeding to said step of positioning said plurality of valves to maximize the flow area through said plurality of orifices; and, sensing conditions under which the positioning of said plurality of valves to cooperatively define a flow area intermediate said minimum and maximum flow areas enhances the efficiency of said chiller and then proceeding to said step of positioning said plurality of valves to define said intermediate flow area.

14. The method for controlling refrigerant flow according to claim 13 wherein each of said sensing steps is accomplished by the use of sensors in said chiller that sense chiller operating parameters that are indicative of the chiller's operating conditions but which are also employed by said chiller for purposes which are different from and additional to controlling refrigerant flow from said condenser to said evaporator.

15. The method for controlling refrigerant flow according to claim 13 wherein said controlling step occurs without input from a liquid level sensor in said condenser.

16. The method for controlling refrigerant flow according to claim 13 comprising the step of employing condenser pressure gas to position said plurality of valves.

17. The method for controlling refrigerant flow according to claim 13 comprising the further steps of positioning said plurality of valve members to maximize the flow area through said plurality of orifices for a predetermined period of time subsequent to the start-up of said chiller, irrespective of the then-existing chiller operating condition and, thereafter, positioning said valves in accordance with which of said first, said second and said third set of chiller operating conditions exists.

18. The method for controlling refrigerant flow according to claim 13 further comprising the steps of compressing refrigerant gas in said chiller a first time to a first pressure; compressing refrigerant gas in said chiller a second time to a second pressure, said first and said second stages of compression occurring in the compressor of said chiller; collecting refrigerant gas, downstream of said plurality of orifices but upstream of the evaporator of said chiller, at a location where the pressure of said gas is intermediate said first and said second pressures; and, delivering said intermediate pressure gas into the stream of gas flowing from said first stage of compression in said compressor to said second stage of compression.

19. The method for controlling refrigerant flow according to claim 13 further comprising the steps of defining a flow path from a location in said chiller that contains condenser pressure gas to each of said plurality of valves; interposing a solenoid valve intermediate each of said plurality of valves and said source of condenser pressure gas; and, positioning each such solenoid in accordance with the then-existing chiller operating condition.

20. An expansion device for a refrigeration chiller comprising:

a housing, said housing defining at least two orifices of predetermined size, the flow path through said orifices being in parallel;

a first valve member, said first valve member being associated with a first of said at least two orifices and being positionable in a first and a second position, the position of said first valve member being determinative of the flow area through said first orifice;

a second valve member, said second valve member being associated with a second of said at least two orifices and being positionable between a first and a second position, the position of said second valve member being determinative of the flow area through said second orifice, the total flow area through said expansion device being determined by the positions of said first and said second valve members with respect to the one of said orifices with which they are associated, said first and said second valve members being cooperatively positionable to minimize the flow area cooperatively defined by said first and said second orifices, to maximize the flow area cooperatively defined by said first and said second orifices and to define a flow area intermediate said minimum and said maximum flow area through said orifices.

* * * * *